May 11, 1965

D. M. HAWKINS ETAL 3,183,427

FIELD REGULATOR FOR DYNAMOELECTRIC MACHINE

Filed March 1, 1961

WITNESSES
John E. Healey Jr.
Lawrence J. Lerner

INVENTORS
David M. Hawkins &
Thomas J. Dolphin
BY
Paul E. Friedemann
ATTORNEY

United States Patent Office 3,183,427
Patented May 11, 1965

3,183,427
FIELD REGULATOR FOR DYNAMOELECTRIC MACHINE
David M. Hawkins, Tonawanda, and Thomas J. Dolphin, Williamsville, N.Y., assignors to Westinghouse Electric Corporation, East Pittsburgh, Pa., a corporation of Pennsylvania
Filed Mar. 1, 1961, Ser. No. 92,527
11 Claims. (Cl. 318—350)

In general this invention relates to a motor speed regulator and, more particularly, to a motor speed regulator utilizing field flux control.

This invention utilizes the regulation of motor field flux rather than motor field current. This type of regulation inherently increases the gain of the motor field regulator.

Heretofore, it has been known that when controlling the speed of a motor, having at least one separately excited field winding, it was necessary to first, increase speed by applying full motor field voltage and increase the terminal voltage across the motor armature until rated armature voltage had been reached, and then reduce the motor field voltage to increase the speed above base speed. The first part of this speed adjustment was conducted under conditions of constant torque and variable horsepower, while the second part was under the conditions of constant horsepower and variable torque. If it became desirable to have a speed system which utilized constant horsepower with a linear change in the speed, it was necessary to place a non-linear resistor in series with the field of the motor. This was so because, although the motor had linear characteristics for field flux versus field current near weak field, any value of field flux approaching full field caused saturation in the pole pieces of the motor. Thus the resistance in series with the separately excited field of the motor would, of necessity, have to be designed to conform to the base speed saturation curve of the motor. This was extremely difficult to design, and undesirable on the basis of cost.

It is a general object of this invention to avoid and overcome the foregoing and other difficulties of, and objections to, prior art practices by the provision of a better and more simple motor speed regulator.

Another object is to provide a better and more simple motor speed regulator utilizing field flux control.

Another object is to provide a better and more simple motor speed regulator utilizing a system whose gain is inherently very high.

Another object of this invention is to provide a better motor speed regulator which utilizes a single control for the full speed range.

Another object of this invention is to provide a better and more simple motor speed regulator which transforms the current in a separately excited field winding to a field flux signal so as to control the motor.

Still further objects and the entire scope of applicability of the present invention will become apparent from the detailed description given hereinafter. It should be understood however that the detailed description while indicating a preferred embodiment of the invention, is given by way of illustration only, since various changes and modifications within the spirit and scope of the invention will become apparent to those skilled in the art from the detailed description.

For a better understanding of the invention, reference should be had to the accompanying drawings, wherein.

Although the principles of the invention are broadly applicable to any direct current motor, the invention is usually employed in conjunction with separately excited direct current motors and hence it has been so illustrated and will be so described. One of the most valuable characteristics of the D.C. motor is its ability to provide a wide range of easily adjustable speeds. This benefit has made D.C. motors of all types of particular interest to control engineers.

When a D.C. motor is operated there is generated in its armature winding a counter E.M.F. signal $E_c$ that acts in opposition to the voltage V impressed across its armature terminals. Since it is a speed determined voltage (i.e., a voltage that depends upon the speed of rotation), this counter E.M.F. signal is directly proportional to the rate at which flux is cut by the armature conductors. Moreover, the signal $E_c$ is always less than the terminal voltage by the amount of armature reaction in the motor. Thus:

where $I_a$=armature current
$R_a$=armature resistance
$\phi$=flux per pole
$S$=armature speed (r.p.m.)
$E_c = V - I_a R_a = K\phi S$ solving for speed:

$$S = \frac{KE_c}{\phi} = K\frac{V - I_a R_a}{\phi}$$

This equation indicates that the speed of a D.C. motor may be controlled by changing either counter E.M.F. or flux. Thus, in a separately excited motor, the effect of a series rheostat in the field circuit, is that raising resistance reduces field flux and increases motor speed and lowering resistance increases field flux and decreases motor speed.

Figure 2:
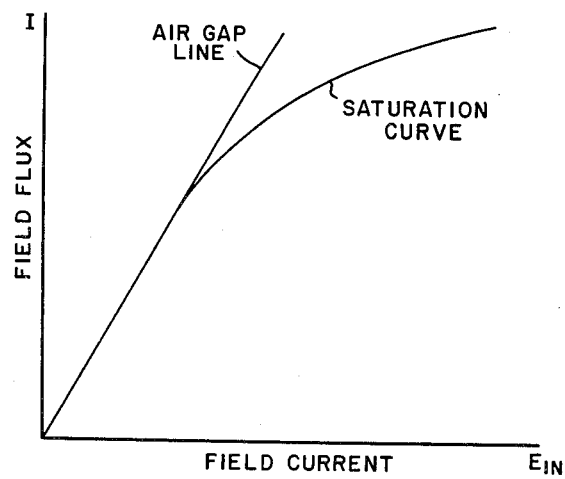
FIG. 2 is a base speed saturation curve which could be obtained with the function generator shown in FIG. 1.

Since the purpose of the above mentioned type of control is to feed more or less field current to the motor, it is necessary to determine what the relationship is between field current and the field flux. This relationship has often been shown as the open circuit characteristic magnetization curve or base speed saturation curve of a motor. An example of this curve is shown in FIG. 2. Basically this characteristic is the magnetization curve for the particular iron and air geometry of the machine under consideration. The straight line tangent to the lower portion of the curve is the air gap line indicating very closely the M.M.F. required to overcome the reluctance of the air gap. If it were not for the effects of saturation, the air gap line and open circuit characteristic would coincide, so that the departure from the air gap line is an indication of the degree of saturation present. The open circuit characteristic may be calculated from the design data of the motor by magnetic circuit methods often guided by flux mapping.

Figure 1:
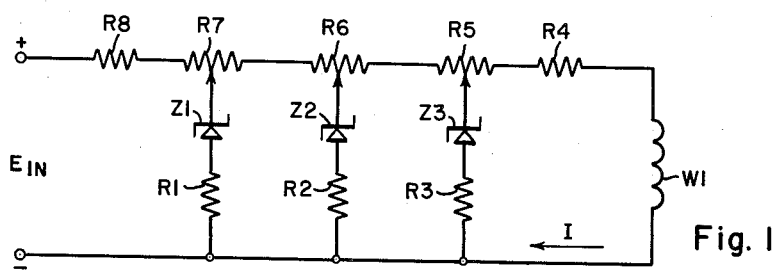
FIGURE 1 is a schematic showing of a function generator such as the one utilized in the present invention.

FIG. 1 is a schematic diagram of a static function generator which can produce a curve similar to the one shown in FIG. 2. This circuit includes a series of resistances R5, R6, R7 and R8 in series with a regulator winding W1 and its associated resistance R4. These components are supplied power from an input signal $E_{in}$. A Zener diode Z1 in series with a resistance R1 is placed in parallel with a portion of the resistance R7, resistance R6, resistance R5, resistance R4 and the regulator winding W1. A second Zener diode Z2 and its associated resistance R2 is placed in parallel with a portion of the resistance R6, resistance R5, resistance R4 and regulator winding W1. A third Zener diode Z3 and its associated resistance R3 is placed in parallel with a portion of resistance R5, resistance R4 and regulator winding W1.

The operation of this circuit is as follows: a voltage $E_{in}$ is supplied across the input terminal, the current I is proportional to this voltage until the voltage necessary to break down the first Zener diode Z1 is reached. At this voltage, Zener diode Z1 breaks down to permit current to flow through resistance R1. This action causes current in the regulator winding not to be proportional to the voltage $E_{in}$. As the voltage $E_{in}$ is increased, the current through R1 is directly proportional to the voltage above the breakdown voltage of Zener diode Z1. When the voltage $E_{in}$ reaches the value which will break down the Zener diode Z2, current starts to flow through resistance R2. The same occurs through resistance R3 after the voltage necessary to break down Zener diode Z3 is reached. As each diode breaks down to pass current, the resulting current I attains the characteristic shown in FIG. 2. The shape of this curve can be made directly proportional to the saturation curve of the motor.

From the above it is seen that the circuit connecting the input ($E_{in}$) to the winding W1 has connected thereacross a plurality of voltage breakdown branches each including in series a threshold voltage device and a resistor, and that the threshold voltage response (voltage breakdown) of each branch occurs at a different value of the input voltage $E_{in}$.

The static function generator shown in FIG. 1 is used in the feedback network of a motor field regulator. The voltage $E_{in}$ is proportional to the motor field current. The regulator input is proportional to motor field flux which in turn is inversely proportional to motor speed. If the function generator were not used, the feedback signal would be proportional to current which is not proportional to flux due to saturation of the machine. The function generator causes the motor field current to rise thus making the field signal proportional to flux. A flux regulated motor field regulator inherently enables the gain of the regulator to be increased while at the same time maintaining high stability.

Figure 3:
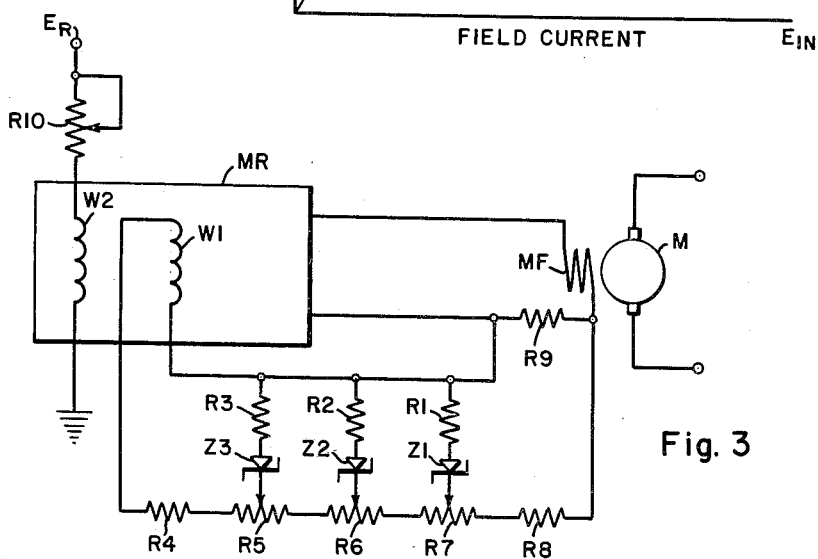
FIG. 3 is a schematic showing of a motor speed regulator utilizing the present invention.

FIG. 3 shows the regulator of the present invention used to control a separately excited D.C. motor. It can readily be seen by one skilled in the art that the regulator of the present invention may be utilized to control other types of motors such as compound D.C. motors and is not limited to one particular type of speed control.

The D.C. motor M shown in FIG. 3 has a separately excited main field winding MF which is supplied power by a motor field regulator MR. This motor field regulator may be a three-phase magnetic amplifier which is controlled by a small magnetic amplifier preamplifier. However, the system is not limited to the above mentioned components but may employ exciters, regulator generators, or other types of regulators. The basic component of the system shown is the static function generator composed of resistances R1 through R8 and Zener diodes Z1, Z2 and Z3 previously described in FIG. 1. The input to the static function generator is obtained from the voltage generated across a resistor R9, in series with the motor field MF, due to the current in that field. The output of the static function generator feeds the flux winding W1 which controls the motor field regulator MR. A second winding W2 is utilized to provide a reference or pattern signal for the motor field regulator MR. The amount of current which flows through this reference or pattern winding W2 is controlled by means of a series variable resistor R10. Both the resistor R10 and the winding W2 are supplied power by a source of D.C. voltage $E_r$. The reference field input utilizes the rheostat 10 which is set by an operator for a desired speed. Since this rheostat is in series, the voltage $E_r$ applied across the reference winding is inversely proportional to the resistance inserted by the rheostat R10. As proven before, the flux is inversely proportional to the speed for any ideal motor. Since the prime desire on a motor field regulator is to obtain speeds directly proportional to rheostat positions field flux is the desired component to regulate. The voltage applied across the pattern field is proportional to flux just as the rheostat resistance inserted is proportional to speed.

To match this pattern field voltage, the voltage across the motor field MF series resistor R9 (which is proportional to motor field current) is applied to the static function generator which in turn provides a signal to the winding W1 which follows a characteristic proportional to the base speed saturation curve of the motor, or motor field flux vs. motor field current. This is shown in FIG. 2. At motor full speed, weak field, the motor flux is directly proportional to motor current. This, of course, assumes a constant counter E.M.F. As the motor speed decreases below full speed, the machine commences to saturate thereby requiring more field current to obtain equal speed increments. At any point below weak field the pattern winding excitation will force the motor field current to any necessary value required until the negative flux winding W1 excitation matches that of the pattern. Since the static function generator matches the motor saturation curve, its output is proportional to motor effective flux, and is obtained by a non-linear motor field current input.

In this system design the slope ratio or the gain of the function generator is an inherent part of the feedback loop. At weak field, this factor is one (1) since the flux is directly proportional to motor field current. At full field, this factor is less than one and is the same as the inverse of the motor base speed saturation curve slope ratio. This inherent gain change permits a much higher gain to be realized at both base and full speeds of the motor. This increase in gain affords a faster and more accurate regulation of motor speed while at the same time maintains high stability.

It will be recognized that the objects of the invention have been achieved by providing the motor speed regulator in which proportionate control of a series resistor in the motor field regulator circuit will allow proportionate changes in the speed of the D.C. motor over a wide range of speed. The regulator utilized has only static elements and, because of the use of the function generator, has an extremely high gain for accurate regulation while maintaining high stability.

While one best known embodiment of the invention has been illustrated and described in detail it is to be particularly understood that the invention is not limited thereto or thereby.

We claim as our invention:

1. In apparatus for regulating a condition of a dynamoelectric machine having electromagnetic field means including field winding means, said field means being subject to magnetic saturation and having a field flux vs. field current characteristic at least a portion of which is non-linear, signal responsive control means for controlling the supply of power to said field winding means, and fourth means responsive to a condition of said machine for producing and supplying to said control means a signal which is a function of said field characteristic including said non-linear portion, said fourth means comprising fifth means for producing a voltage proportional to the current in said field winding means, a circuit connecting said fifth means to said control means, and a plurality of branches connected across said circuit, each of said branches having a different threshold voltage value.

2. In apparatus for regulating a condition of a dynamoelectric machine having electromagnetic field means including field winding means, said field means being subject to magnetic saturation and having a field flux vs. field current characteristic at least a portion of which is non-linear, signal responsive control means for controlling the supply of power to said field winding means, means for supplying a reference signal A to said control means, and fifth means responsive to the current in said field winding means for producing and supplying to said control means a signal B which is proportional to said field characteristic including said non-linear portion, said signals A and B having opposite control effects on said control means, said fifth means comprising sixth means for producing a voltage proportional to the current in said field means, a pair of lines connecting said sixth means to said control means, one of said lines having series resistor means with a plurality of taps, and a branch connected between each of said taps and said other line, each of said branches including a voltage threshold device.

3. In apparatus for regulating a condition of a dynamoelectric machine having electromagnetic field means including field winding means, said field means being subject to magnetic saturation and having a field flux vs. field current characteristic at least a portion of which is non-linear, signal responsive control means for controlling the supply of power to said field winding means, means for supplying a reference signal A to said control means, and fifth means responsive to the current in said field winding means for producing and supplying to said control means a signal B proportional to said field characteristic including said non-linear portion, said signals A and B having opposite control effects on said control means, said fifth means comprising sixth means for producing a voltage proportional to the current in said field winding means, a circuit connecting said sixth means to said control means, and a plurality of parallel branches connected across said circuit, each branch having a different threshold voltage value.

4. The combination as in claim 1 wherein each of said branches includes in series a threshold device and resistance means.

5. The combination as in claim 2 wherein at least one of said branches includes series resistance means.

6. The combination as in claim 3 wherein each of said branches includes a threshold device, and at least one of said branches includes series resistance means.

7. In apparatus for regulating a condition of a dynamoelectric machine having electromagnetic field means including field winding means, said field means being subject to magnetic saturation and having a field flux vs. field current characteristic at least a portion of which is non-linear, signal responsive control means for controlling the supply of power to said field winding means, and fourth means responsive to the current in said field winding for producing and supplying to said control means a signal which is a function of said field characteristic including said non-linear portion, said fourth means comprising fifth means for producing a voltage proportional to the current in said field winding means, a circuit connecting said fifth means to said control means, and a plurality of branches connected across said circuit, each of said branches including a threshold voltage device, each of said branches having a threshold voltage response occurring at a different value of said voltage produced by said fifth means.

8. The combination as in claim 7 wherein at least one of said branches further includes resistance means in series with the voltage threshold device in that branch.

9. In apparatus for regulating a condition of a dynamoelectric machine having electromagnetic field means including field winding means, said field means being subject to magnetic saturation and having a field flux vs. field current characteristic at least a portion of which is non-linear, signal responsive control means for controlling the supply of power to said field winding means, means for supplying a reference signal A to said control means, and fifth means responsive to the current in said field winding means for producing and supplying to said control means a signal B proportional to said field characteristic including said non-linear portion, said signals A and B having opposite control effects on said control means, said fifth means comprising sixth means for producing a voltage proportional to the current in said field winding means, a circuit connecting said sixth means to said control means, and a plurality of parallel branches connected across said circuit, each branch including a voltage threshold device, each of said branches having a threshold voltage response which occurs in response to a different value of said voltage produced by said sixth means.

10. The combination as in claim 9 wherein at least one of said branches includes resistance means in series with the threshold voltage device in the branch.

11. In apparatus for regulating a condition of a dynamoelectric machine having electromagnetic field means including field winding means, said field means being subject to magnetic saturation and having a field flux vs. field current characteristic at least a portion of which is non-linear, signal responsive control means for controlling the supply of power to said field winding means, means for supplying a reference signal A to said control means, and fifth means responsive to the current in said field winding means for producing and supplying to said control means a signal B which is proportional to said field characteristic including said non-linear portion, said signals A and B having opposite control effects on said control means, said fifth means comprising sixth means for producing a voltage proportional to the current in said field means, a pair of lines connecting said sixth means to said control means, and a plurality of branches connected across said lines, each of said branches including in series a resistor and a voltage threshold device, each of said branches having a threshold voltage response occurring in response to a different value of said voltage produced by said sixth means.

References Cited by the Examiner
UNITED STATES PATENTS

| | | | |
|---|---|---|---|
| 2,534,207 | 12/50 | Picking et al. | 318—350 X |
| 2,882,477 | 4/59 | King et al. | 318—357 |
| 2,929,975 | 3/60 | Caldwell et al. | 318—154 |
| 2,930,960 | 3/60 | Chausse | 318—357 X |
| 3,007,099 | 10/61 | Greening et al. | 318—317 |
| 3,022,453 | 2/62 | Jones | 318—154 |
| 3,026,464 | 3/62 | Greening et al. | 318—327 |
| 3,047,729 | 7/62 | Peterson et al. | 307—18 |
| 3,054,937 | 9/62 | Long | 318—154 X |
| 3,082,364 | 3/63 | Fischer et al. | 318—533 X |

ORIS L. RADER, *Primary Examiner.*

JOHN F. COUCH, *Examiner.*